United States Patent [19]

Shimrock et al.

[11] Patent Number: 4,550,034
[45] Date of Patent: Oct. 29, 1985

[54] METHOD OF IMPREGNATING CERAMIC MONOLITHIC STRUCTURES WITH PREDETERMINED AMOUNTS OF CATALYST

[75] Inventors: Thomas Shimrock, Chatham, N.J.; R. Dirk Taylor, Northfield; John M. Collins, Jr., Sagamore Hills, both of Ohio

[73] Assignee: Engelhard Corporation, Iselin, N.J.

[21] Appl. No.: 596,993

[22] Filed: Apr. 5, 1984

[51] Int. Cl.⁴ ............................................. B05D 5/00
[52] U.S. Cl. ................................... 427/243; 427/294; 427/443.2; 502/439; 502/514
[58] Field of Search ............... 427/238, 243, 244, 245, 427/247, 294, 350, 443.2, 295, 296, 297; 502/355, 439, 514, 527; 118/50, 50.1

[56] References Cited

U.S. PATENT DOCUMENTS

| | | | |
|---|---|---|---|
| 2,867,544 | 1/1959 | Hall, Jr. | 118/50 |
| 3,901,821 | 8/1975 | Retallick | 502/527 |
| 4,208,454 | 6/1980 | Reed et al. | 427/238 |

Primary Examiner—Norman Morgenstern
Assistant Examiner—Ken Jaconetty

[57] ABSTRACT

A method for impregnating the interior skeletal structure of a ceramic monolithic catalyst support with a slurry of catalyst material is disclosed wherein a predetermined amount of catalyst slurry is metered into contact with a first end of the support. A cover is placed over the periphery of a second, opposite end of the support in sealing relation thereto to define a vacuum chamber adjacent the second end. A vacuum is drawn on the cover to draw catalyst slurry into the skeletal structure from the second end whereby the interior skeletal structure is uniformly impregnated with the catalyst slurry.

17 Claims, 1 Drawing Figure

METHOD OF IMPREGNATING CERAMIC MONOLITHIC STRUCTURES WITH PREDETERMINED AMOUNTS OF CATALYST

BACKGROUND OF THE INVENTION

1. Field of the Invention

This invention relates to the impregnation of ceramic monolithic catalyst supports and more particularly to impregnating the support with a predetermined amount of catalyst.

2. The Prior Art

The need to remove or convert the noxious components in vehicular exhaust gases is now well known as a means for overcoming air pollution. Also, the present and proposed future requirements for having catalytic exhaust gas converters on motor vehicles are quite well known. One form in which the catalysts for the converters are supplied is as catalytically coated rigid skeletal monoliths, or honeycomb type of elements which are generally cylindrical or oval in shape, where there are a multiplicity of longitudinal passageways in each unit in order to provide a high surface area.

The rigid, monolithic, skeletal structures are typically made from ceramics which comprise refractory crystalline materials such as sillimanite, magnesium silicates, zircon, petalite, spodumene, cordierite, aluminosilicates, mullite or combinations thereof. Such materials are generally considered to have a porous surface, but to improve the porosity of the surfaces of the skeletal surface, it is generally advisable to provide a highly porous alumina coating over the skeletal structure prior to effecting surface impregnation with a catalytically active material. These monolithic, substantially catalytically inactive monolith skeletal support members have been described in prior art patents, as for example in Keith et al U.S. Pat. Nos. 3,331,787 and 3,565,830, such that it is not deemed necessary to describe them in detail herein.

Typically, and by way of example only, the catalytic component will comprise one or more of the noble and base metals and metal oxides of Groups IB, VB, VIIB and VIII of the Periodic Table, particularly copper, vanadium, chromium, manganese, iron, cobalt, nickel, platinum, palladium, rhodium and ruthenium, with one catalytic metal being used singly or in combination with one or more other active metals.

While various methods are known in the art for coating a monolith support with a refractory coating such as alumina and noble metal catalytic coatings such as platinum, palladium and rhodium, such methods from the standpoint of costs are deficient in minimizing the amount of coating applied, especially when a costly catalytically active precious metal, e.g. platinum, palladium or rhodium is codeposited with the high surface area refractory metal.

Thus, U.S. Pat. No. 3,565,830 discloses the immersion of the monolith skeletal structure in the coating slurry with agitation to coat the internal passageways fully, followed by shaking and gently blowing with air to remove excess coating slurry from the exterior surface and open any plugged passageways. U.S. Pat. No. 3,873,350 to Dwyer et al., also involves immersing the monolith support in a coating slurry, removing the coated support and draining excess slurry while shaking the support, and rotating the support about a substantially horizontal axis while blowing air through the passageways.

Such immersion coating techniques are time consuming, and the slurry coats the entire substrate including the interior skeletal structure as well as the circumferential exterior peripheral surface. When precious metals such as noble metal catalyst salts are incoporated in the slurry, the coating process is unnecessarily expensive. This is because the noble metal coating applied to the circumferential outer surface periphery of the monolith support is unnecessary as no gaseous components to be catalyzed by automotive exhaust gas converters are ever brought into contact therewith during normal use of the catalyzed monolith.

Vacuum pressure impregnation of the ceramic monolith support with the coating slurry has been proposed to speed up the coating process. Thus, in U.S. Pat. No. 4,039,482 a ceramic monolithic member is sequentially coated with alumina and a catalytically active metal such as platinum or platinum wherein the member is placed in a pressure chamber, the chamber flooded with coating slurry and the member vacuum treated to impregnate the member with the slurry. After vacuum impregnation, the slurry is drained from the chamber and pressurized air is blown through the chamber to remove excess slurry from the chamber and the member before the member is subjected to high temperature drying.

In U.S. Pat. No. 4,208,454, the ceramic monolithic member is also flooded with the slurry and the member is subjected to a vacuum to draw slurry through the skeletal passageways of the member. The vacuum application is continued to remove plugging and excess slurry by continuing to draw air through the passageways of the member.

The vacuum impregnation processes of U.S. Pat. No. 4,039,482 and U.S. Pat. No. 4,208,454 both involve flooding the ceramic monolithic member with excess amounts of coating slurry. The handling of large excesses of coating slurry invariably leads to inadvertent by nonetheless costly, loss of high cost catalytic metal material. The flooding of the ceramic member, in the vacuum impregnation process disclosed in U.S. Pat. No. 4,039,482, with coating slurry prior to impregnation still deposits a costly and functionally useless amount of coating material on the exterior peripheral surface of the member.

The use of an excess amount of coating slurry in the processes of U.S. Pat. No. 4,039,482 and U.S. Pat. No. 4,208,454 requires the extra steps of removal of the excess coating material as by air blowing in U.S. Pat. No. 4,039,482 and continued vacuum application as in U.S. Pat. No. 4,208,454. These steps are time consuming and add to the cost of the process.

There is, thus, a need in the art for precisely controlling the amount of alumina and metal catalyst slurries applied to ceramic monolithic catalyst supports to reduce the amount of excess coating required so that there may result an improvement in efficiency of the process and a reduction in coating material loss.

SUMMARY OF THE INVENTION

The present invention meets this need by providing a method for vacuum coating ceramic support members with a slurry of refractory and/or catalyst metal components wherein precisely controlled, predetermined amounts of the slurry are metered to the ceramic monolithic support member. This eliminates the need for flooding the member with excess coating material and the ancilliary steps for removal of the excess coating material from the member. By using the process of the present invention, it is possible to apply a uniform coating of the desired concentration of the refractory and catalyst metal components without the need for external coating removal or internal unplugging of the internal skeletal passageways of the ceramic monolithic structure.

In the method of the present invention, the lower end of a ceramic monolithic catalyst support member to be impregnated with a slurry of a refractory material or a catalyst metal component or both is placed in a reservoir or vessel containing a predetermined amount of the slurry necessary to provide the desired concentration of coating within the skeletal passageways of monolithic member. A hollow cover is placed over one end of the ceramic monolithic member in sealing relation with the peripheral surface of the end. Vacuum (i.e., subatmospheric pressure) is applied to the opposite end of the monolith and coating slurry is drawn into the interior skeletal passageways of the ceramic monolithic member under the action of the vacuum until the slurry contained in the reservoir is exhausted. Thereafter, the vacuum is broken and the cover is removed from the ceramic monolithic member to retrieve the coated member.

By the practice of the present invention, only the interior skeletal passageways of the monolithic member are coated. No draining or purging of excess coating slurry from the monolithic member is necessary or required nor is any pre-vacuum application step, such as pre-evacuation of air from the ceramic member, required. The ceramic monolithic member internally coated with a predetermined amount of the coating slurry may, thereafter, be passed to a drying and/or heat treating zone to effect high temperature curing of the coating. In addition, an unplugging step is not a prerequisite to such heating step.

In a preferred embodiment of the invention, it has been found advantageous that after one end of the ceramic member has been subjected to vacuum impregnation with a portion of the coating slurry, generally about 50 to about 85% of the total predetermined amount of slurry, to invert the ceramic monolithic member and continue the vacuum impregnation from the opposite end. This has been found to speed up the impregnation process and materially improve the uniformity of the coating distribution on the interior skeletal passageway walls.

BRIEF DESCRIPTION OF THE DRAWINGS

In the FIGURE, there is illustrated a schematic cross sectional view of one embodiment of a simplified system by which the method of the present invention may be practiced to coat ceramic monolithic skeletal support members. It is thought a better understanding of the features and advantages of the present invention will be more readily apparent to those skilled in the art by a study of the following detailed description together with reference to the drawing.

DETAILED DESCRIPTION

Figure 1:
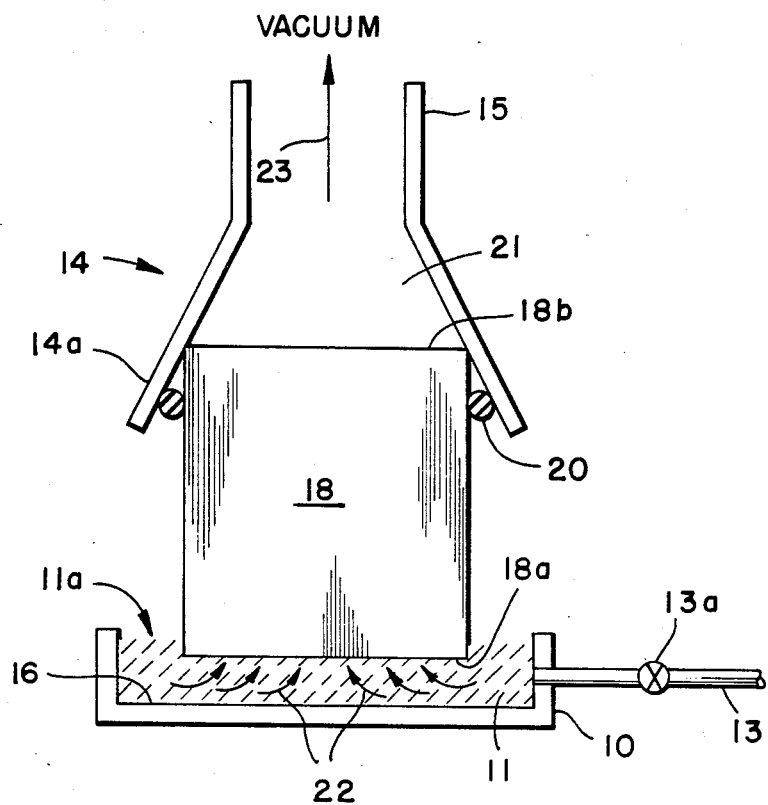

As shown in the FIGURE, one arrangement of a system suitable for a preferred practice of the invention is comprised of two main sections. The first section includes an open-topped vessel or pan 10 containing a bath of coating slurry 11. The slurry level is indicated by reference numeral 11a. An opening through a wall of the pan 10, inlet 13, is provided with valve 13a suitably arranged for manipulation external of the pan 10. The valve 13a can be manipulated either manually or automatically.

The second section is positioned above the first section and is comprised of a hollow cover 14 having an outwardly flared circumferential lip 14a at its bottom. Opening through the top of the cover 14 is a conduit 15. Conduit 15 is provided with a suitable valve (not shown) and is connected to a vacuum pump means (not shown).

Positioned submerged below the slurry level 11a and spaced from the bottom 16 of the pan 10 is a ceramic monolithic member 18. The interior of the member 18 is provided with a plurality of longitudinal passages extending from end to end thereof. For clarity, the shape of the support is schematically shown in the figure as square, but, in practice, the shape of the support is generally cylindrical or oval in configuration. The monolithic member 18 is supported in the coating slurry by a suitable support means (not shown) which can take the form of a holder such as a mechanical clamping holder. Preferably, the holder is provided with means whereby the monolithic member 18 can be rotated and inverted 180 degrees in the coating slurry 11.

The monolith 18 is supported in the pan 10 so that the lower end 18a of the monolith is spaced a predetermined distance from the bottom 16 of the pan. As will hereinafter be demonstrated, this predetermined gap constitutes a critical feature of the invention when the coating slurry is to be drawn up into the monolith 18 through end 18a from the pan 10. The monolith is preferably supported above the pan 10 with vertical orientation for its plurality of longitudinal passageways. In this manner, vacuum draw-up of coating slurry 11 from the pan 10 is expedited and rapid flow of coating slurry 11 into the surface pores of the ceramic monolith 18 is promoted.

Conduit 13 is connected to a pump means (not shown) which pumps a predetermined amount of coating slurry from a bulk storage reservoir of coating slurry (not shown) into the pan 10 between successive vacuum coating treatments of the monolith 18. Valving means 13a can be provided on conduit 13 for the timed introduction of the predetermined quantity of coating slurry 11 into the pan 10 when a plurality of coating applications is to be applied to the monolith or when a plurality of monolithic members is to be successively impregnated with coating slurry in a continuous production operation.

The cover 14 is adapted to move vertically (by means not shown) so that it can be raised and lowered in and out of contact with the peripheral edge portion of upper end 18b of the monolith 18. When the monolith 18 is to be impregnated with coating slurry 11 from pan 10, the cover 14 is lowered into contact with the upper end 18b of the monolith 18 so that the lip 14a thereof engages the outer edges of the upper end 18b of the monolith. A seal 20 is interposed between the lip 14a of the cover 14 and the peripheral edge of upper end 18b of the monolith 18 in sealing relation to define a chamber 21 above the upper end 18b of the monolith.

In operation, a ceramic monolith 18 is moved from storage and supported over the pan 10 in spaced relation to the bottom surface 16 of the pan 10. Valve 13 is opened to admit a predetermined amount of slurry coating 11 into the pan 10 which is pumped into the pan 10 from storage. The controlled metered amount of coating slurry 11 fills the pan 10 to a level 11a into which the lower end 18a of monolith is submerged in the slurry. The cover 14 is moved downwardly over the monolith 18 until the cover lip 14a seats on the peripheral edge of the upper end 18b of the monolith. A pressure fit is formed by the interposition of seal 20 between the cover lip 14a and the monolith upper edge 18b. The valve in conduit 15 is then adjusted to interconnect the chamber 21 with the vacuum pump (not shown).

A reduced pressure is applied in the chamber 21 which causes the coating slurry to be drawn upwardly from the pan 10 into the submerged portion of the monolith 18 under the influence of the vacuum created in the chamber 21. Arrows 22 indicate the stream of slurry being pulled into the submerged monolith end 18a. Arrow 23 indicates the direction in which the vacuum is applied. The vacuum is maintained in the chamber 21 for a sufficient time whereby the coating slurry 11 drawn into the submerged portion of the monolith 18 is steadily drawn upwardly through the interior passageways of the monolith 18 to provide a uniform coating of high surface area coating and/or catalyst in the amount required for catalytic conversion of noxious automobile exhaust gases.

After exhaustion of the coating slurry in the pan 10, the vacuum in the chamber 21 is broken to bring the chamber to atmospheric pressure conditions. Thereafter, the cover 14 is raised from the upper edge 18b of the monolith 18. The monolith 18 is then moved from its supported position over the pan 10 directly to a drying station (not shown) where the coating impregnated on the interior passageways of the monolith is dried and, if necessary, calcined. As an exact amount of coating has been impregnated in the monolith 18, the necessity for draining external coating blow-off and internal purging stations in the coating operation is eliminated.

The coating slurries used in the practice of the present invention contain suspended high surface area refractory solids, such as gamma alumina or catalytically active metals; e.g., platinum and palladium; in the form of water soluble salts; e.g., chloroplatinic acid and palladium chloride; can be co-deposited with the refractory solids from the same slurry. The amount of such coating slurry to be deposited and therefore metered to the pan 11 between the coating of successive monoliths can be readily calculated before the coating operating is initiated on the basis of the interior surface area of the skeletal monolith to be coated if the weight of coating material required to be left on the monolith interior pasageways after drying and the solids content of the slurry is known in accordance with the formula:

Weight of the charge (wet gain) =

$$\frac{\text{Volume of substrate (cu. in.)} \times \text{Dry Gain (gms/cu. in.)}}{\% \text{ solids in slurry}/100}$$

where,
"wet gain" is the amount of slurry, in grams, predetermined for impregnation on the monolith interior passageways and meters to the pan 10,
"volume of substrate" is the internal cross-sectional area multiplied by the height of the monolith intended to be coated, and
"dry gain" is the amount of solid coating material; e.g., refractory material or catalyst or both remaining on the internal passageways of the monolith after complete drying and removal of substantially all of the volatile liquid component from the impregnated slurry.

Typical properties of a coating slurry used in the practice of the present invention; e.g., a catalyzed platinum-palladium/alumina slurry are as follows:

| Property | General Range | Pref. Range |
| --- | --- | --- |
| Viscosity, cps | 15–300 | 17–70 |
| % Solids | 35–52 | 45–50 |
| Alumina, % of solids | 50–99.9 | 65–99 |

In practice when applying the coating slurry, the vacuum drawn on the monolithic member 18 generally ranges from about 0.5 inches of water to about 20.0 inches of water, or more. In a preferred practice of the invention, after the upper edge 18b of the monolith is placed in sealing relation with the cover 14, a sequential application of increasing subatmospheric pressure is used for impregnating the monolithic member. Thus, when using coating slurries in which the viscosity is in the more preferred range of about 45 to about 50 cps, a relatively low vacuum; e.g., about 0.5 to about 0.7 inches of water is drawn on the monolithic member for a 1 to 8 second time period to impregnate the monolith with about 50 to 85% of the predetermined wet gain of slurry.

By first subjecting the monolith to the lower vacuum in the range indicated, the passageways of the monolith are impregnated uniformly with little evidence of "spiking" of the coating slurry impregnant in the interior passageways of the monolith 18. Spiking is a phenomenon which occurs such as when the initial vacuum applied is too high, the slurry is not drawn uniformly up into the cells of the substrate. In some cells, the slurry level rises as much as 2 inches above the center of the substrate. These cell peaks are called spikes. Thereafter, a higher vacuum; i.e., a vacuum in the order of 5 to 10 times greater than the first applied vacuum; e.g., a vacuum in the order of about 3 to about 20 inches of water is applied to the monolith over a 10-30 second period to draw the remaining portion of the coating slurry into the internal passageways of the monolith.

Subjecting the monolith during the draw-up stage of the impregnation process to a high initial vacuum; i.e., a vacuum in the order of 6 to 8 inches of water, reduces the time required for the coating slurry impregnation to be completed. However, it has been determined that the use of such high initial vacuum for impregnation causes a portion of slurry to be drawn through the upper end of the monolith causing a wasteful loss of slurry material. In addition, such a high vacuum results in the large spikes of coating material being caused to be non-uniformly deposited on the internal passageways of the monolith. Such non-uniform coating impregnation can diminish the utility of the catalyzed monolith in the conversion of noxious gases in automblile exhaust gases.

As has already been noted, the coating slurries used in the practice of the present invention range from about 15 to about 300 cps and preferably from about 17 to about 70 cps. At this viscosity range, the coating slurry drawn into the interior passageways of the monolith will tend to be retained on the walls of the passageways. As the viscosity of the slurry is increased, the vacuum required to be drawn on the monolith must be adjusted upwardly accordingly. If the coating slurry viscosity is much lower than 15 cps, coating drawn-through may become a problem.

In practicing the coating slurry vacuum impregnation process of the present invention, it is critical that when the monolith is supported in the vessel, partially submerged in the coating slurry, that the bottom edge of the monolith 18a be positioned in the vessel so that there exists, before the vacuum is drawn on the monolith, a gap between the bottom edge of the monolith and the bottom surface 16 of the pan 10. The exact dimensions of the gap will vary according to the size and shape of the monolith.

The gap distance most desirable for a specific monolith coating impregnation can be easily and readily determined experimentally. Thus, for a 3.18×6.68×6.3 inch long oval cordieriete monolith, the optimum gap distance between the bottom edge of the monolith and the bottom edge of the vessel has been determined experimentally to be about 0.040 inches. When the gap between the bottom edge 18a of the monolith 18 and the bottom surface 16 of the pan 10 is near this prescribed distance, a substantially uniform deposition of coating slurry will be achieved by the vacuum impregnation process of the present invention on the interior walls of the monolith. If the gap is more or less than the optimum amount determined experimentally, a non-uniform deposition of coating slurry has been found to result. Thus, if the gap is greater than the optimum amount, the coating material impregnated on the monolith is concentrated in a central core portion of the monolith. If the gap is less than the optimum amount, the impregnated coating material is concentrated in an outer annulus portion of the monolith.

Generally, it has been determined that for a monolith structure ranging in height from about 2.5 to about 6.3 inches, the gap distance at which uniform coating application will generally occur is in the range of about 0.020 to about 0.125 inches.

In practicing the process of the present invention, it has also been found to be advantageous during the vacuum impregnation step that after the monolith has been impregnated with about 50 to about 85% by weight of the predetermined amount of coating slurry, that the vacuum is broken, the monolith is inverted 180 degrees and the vacuum impregnation continued from the opposite end. This has been found to improve the uniformity of coating distribution on the passageway walls.

The impregnated monolith following impregnation with the coated slurry is passed to a drying station wherein the coated monolith is dried to remove the free water in the monolith. Generally, the monolith is dried at 125–250 degrees C. to insure the removal of any combined water and to insure adhesion to the interior walls of the monolith. Drying the coated monolith is followed by a controlled cooling whereby the monolith is cooled sufficiently so that an operator can handle it without protective gloves.

As the process of the present invention accomplishes coating application of monoliths using precise, controlled, predetermined amounts of coating material, the coating process can be accomplished with reduced inventories of coating materials, reduced handling problems and therefore a reduced charge for mishandling and inadvertent loss of costly catalyst material.

By the process of the present invention, the internal coating of monolith structures with a predetermined amount of coating slurry can be carried out in a rapid manner, as for example in a period of less than one minute. This is compared to the slow, time consuming procedures which involve handling of the monolith members in a dipping or spraying procedure for the coating slurries.

The process of the present invention also represents an improvement over prior art vacuum impregnation processes as no excess coating material is deposited on the exterior sidewalls of the monolith thereby eliminating a blow-off step and loss of costly coating material. As no excess material is deposited on the internal passageways of the monolithic support, the purging station of prior art vacuum impregnation coating processes is also eliminated. The process of the present invention also permits rapid coating without degassifying of the monolith and provides the uniform deposition of coating slurry in a matter of seconds.

As will hereinafter be illustrated by the practice of the process of the present invention, monolithic catalyst support members can readily be coated with exact amounts of the required coating slurry. This amount of material can be calculated prior to the coating process. It is independent of the initial weight of the monolith, the amount of coating deposited on successive monoliths being substantially uniform, the variation in coating deposits being as low as plus or minus 0.5%.

By using exact amounts of coating material in the vacuum impregnation process of the present invention, little or no residual coating slurry remains in the vessel 10 after a coating run is completed. This eliminates a potential area for loss of coating material. Thus, a material balance analysis of a coating run using the process of the present invention indicated that 99.7% of the coating slurry used in coating cordierite monoliths was actually deposited in the monoliths. It was determined that 0.1% by weight of the coating slurry was trapped in a filter in the vacuum system and 0.2% by weight of the coating solids remained in the coating pan.

In order to further illustrate the process of the present invention in effecting the impregnation of ceramic monolith members, the following examples are set forth:

EXAMPLE I

A series of 9 preweighed 3.18"×6.68"×6.3" long oval shaped ceramic monolithic members having an internal honeycomb structure with an internal surface volume of 110.3 cu. in. designated M-20 available from Corning composed of cordierite (2 MgO.2Al$_2$O$_3$.5SiO$_2$) were internally coated with a coating slurry having a viscosity of 49 cps containing 45.1% by weight solids (in which alumina comprised 66.5% by weight of the solids content, the remainder being a catalytic mixture of platinum and rhodium at a 10:1 weight ratio and a base metal oxide. The specifications for use of the ceramic monolith in an automobile catalytic converter required that 253.91 grams of the coating mixture be uniformly deposited on the interior passageways of the monolith. The amount of coating slurry required for such solids deposition was calculated using the formula previously disclosed above, namely:

$$\text{Wet gain} = \frac{110.3 \text{ cu. in.} \times 253.91 \text{ gms/cu. in.}}{45.1/100} = 563 \text{ grams}$$

The coating slurry was deposited on the interior passageways of the monolith using an apparatus of the type shown in the schematic Figure. In coating each of the 9 monoliths, one-half the predetermined amount of coating slurry; e.g., about 281-282 grams, was metered into the pan 10. The end of the monolith was dipped in the coating slurry and vertically positioned therein so that a gap of 0.040 inches was created between the lower edge 18a of the monolith and the bottom surface 16 of the pan 10. The hollow cover 14 was lowered over and sealingly engaged with the peripheral surface of the upper edge 18b of the monolith. The top of the monolith was then sequentially subjected to 0.625 inches of water of vacuum for 5 seconds to load 50% of a predetermined coating slurry charge into the monolith. This was followed by increasing the vacuum to an amount sufficient to draw 200 SCFM of air (9 inches of water) for an additional 15 seconds to fully impregnate the cells of about half of the monolith with the coating slurry already drawn into the monolith. Thereafter, the vacuum was broken, the second half of the predetermined amount of coating slurry was metered into the pan, and the monolith was inverted 180 degrees to position the upper edge of the monolith in the pan also at the 0.040 inch gap. The vacuum sequence was repeated; i.e., 0.625 inches of water of vacuum for 5 seconds followed by 9 inches of water of vacuum for 15 seconds to impregnate the cells of the remaining 50% of the surface area of the monolith. The coating slurry impregnated monoliths were weighed to determine the wet gain of slurry. The coated monoliths were then dried at about 120° C. for 1 hour and weighed again. The results are recorded in Table I below, the monoliths coated by this procedure being designated by the letters A1–A9.

When coating run I-9 was completed, the pre-weighed pan and a filter in the line 15 leading from the cover 14 to the vacuum pump were dried and weighed. The weight gain in grams of the pan was determined to be 3.5 grams or 0.073% of the total slurry deposited on the monolith. This respresents the amount of coating slurry which remained in the pan and was lost to the coating process. The weight gain in grams of the filter was determined to be 38.4 grams or 0.81% of the slurry deposited on the monolith. This represents the amount of coating slurry which was drawn through the monolith and not deposited on the internal passages of the monolith. These percentages indicate that less than 1% of the coating slurry was lost in the coating process.

Three equal sections were cut horizontally through the dried monoliths coated in accordance with Example I to determine the uniformity of the penetration gradient of the coating material on the internal surfaces of the monolith. Examination of these cut sections indicated that the coating material was substantially uniformly distributed over the entire interior surface of the monolith. This represented to the experienced examiner of these monolith sections a substantial improvement when compared to penetration gradients of coating material previously encountered with dipping application of coating slurries onto similar monolithic structures.

TABLE I

| Sample | Raw Weight (grams) | Wet Gain (grams) | Raw wt & Dry Gain (grams) | Dry Gain (grams) |
| --- | --- | --- | --- | --- |
| A-1 | 768.5 | 504.5 | | |
| B-2 | 766.5 | 508.5 | | |
| C-3 | 766.0 | 506.0 | | |
| D-4 | 761.0 | 506.0 | 1014.7 | 253.7 |
| E-5 | 762.0 | 511.0 | | |
| F-6 | 761.5 | 521.5 | 1016.0 | 254.5 |
| G-7 | 761.5 | 512.5 | | |

TABLE I-continued

| Sample | Raw Weight (grams) | Wet Gain (grams) | Raw wt & Dry Gain (grams) | Dry Gain (grams) |
| --- | --- | --- | --- | --- |
| H-8 | 761.0 | 513.0 | | |
| I-9 | 760.5 | 510.0 | 1013.6 | 253.1 |

EXAMPLE II

The procedure of Example I was repeated with the exception that the monolith was sequentially subjected to 0.625 inches of water of vacuum for 5 seconds to load 85% of the predetermined amount of coating slurry into the monolith followed by 9 inches of water vacuum for 20 seconds to fully impregnate the cells of the monolith with the coating slurry already drawn into the monolith. Thereafter, the monolith was inverted 180 degrees to position the upper end of the monolith in the pan 10 and then subjected to 9 inches of water vacuum for 15 seconds to both load and impregnate the cells of the opposite end of the monolith with the remaining 15% of the predetermined amount of slurry. The results of this procedure are recorded in Table II below, the monoliths coated by this procedure being designated by the letters J-1.

Penetration gradient tests indicated substantially uniform penetration over the entire internal monolith internal surfaces.

TABLE II

| Sample | Raw Wt. (grams) | Wet Gain (grams) | Raw Wt & Dry Gain (grams) | Dry Gain (grams) |
| --- | --- | --- | --- | --- |
| J-1 | 765.0 | 510.0 | | |
| K-2 | 768.0 | 529.0 | | |
| L-3 | 767.0 | 509.0 | | |
| M-4 | 760.5 | 510.5 | | |
| N-5 | 765.0 | 507.0 | 1019.9 | 254.9 |
| O-6 | 762.0 | 513.0 | 1015.9 | 253.9 |
| P-7 | 759.0 | 514.0 | | |
| S-8 | 762.5 | 514.5 | | |
| T-9 | 762.0 | 515.0 | 1015.6 | 253.6 |

EXAMPLE III

The procedure of Example I was repeated with the exception that 6 oval shaped monoliths 3.18"×6.68"×6.3" long, were coated with 614 grams of a precious metal slurry composed of 80% alumina, 1.8% precious metals (Pt:Rh of 5:1) and 18.2% base metal oxides having a viscosity of 55 centipoises and a solids content of 47.09%. The gap between the lower edge of the monolith submerged in the bath of coating slurry and the surface of the pan was 0.075 inches.

A sequential vacuum draw was not employed, but instead a vacuum sufficient to draw 200 scfm of air (9" water) was applied for 2 minutes to draw the first half of the 614 gram charge of slurry into the monolith. After the first half portion of 614 gram slurry charge was drawn into the monolith and uniformly deposited in the cells of the internal skeletal structure, the vacuum was broken and the monolith inverted 180 degrees to submerge the upper end of the monolith in the coating bath at the same gap between monolith and pan to draw the second half of the slurry charge into the upper end of the monolith. A similar application of vacuum; i.e., 9 inches of water for 2 minutes was used to draw the remaining half of the coating into the monolith where it was also uniformly deposited.

The monoliths were then dried at 200 degrees C. for 13 hours. Examination of the dried monolith indicated that the precious metal solids had been evenly distributed throughout the monolith. Analysis of the solids pick-up of the 6 monoliths indicated a one sigma variation between successively coated monoliths of plus or minus 1.4%. These results are more fully disclosed in Table III below.

TABLE III

| SAMPLE NO. | GRAMS SLURRY VACUUM DRAWN | | SUPPORT WEIGHT (grams) | | SOLIDS PICK-UP (grams) | % OF SLURRY |
|---|---|---|---|---|---|---|
| | 1st Draw | 2nd Draw | RAW | DRY* | | |
| 1. | 307.5 | 306.5 | 767 | 1069 | 302 | 49 |
| 2. | 306.5 | 306 | 765 | 1066 | 301 | 49 |
| 3. | 306.5 | 306 | 763 | 1065 | 302 | 49 |
| 4. | 306 | 306 | 761 | 1064 | 303 | 49 |
| 5. | 306.5 | 306.5 | 765 | 1068 | 303 | 49 |
| 6. | 306.5 | 306 | 763 | 1068 | 305 | 50 |
| | | | | Average | 302 | 49% |
| | | | | | $\Sigma = \pm 1.4\%$ | |

*Dried @ 200° C.

EXAMPLE IV

The procedure of Example III was repeated with the exception that all the predetermined amount of coating slurry was drawn into the monolith through the lower end of the monolith with no inversion of the monolith being attempted. The vacuum applied to draw all 614 grams of the coating slurry into the monolith from the lower end was sufficient to draw 200 scfm of air for 5 minutes. Although examination of the 6 coated monoliths indicated that the precious metal solids had been evenly distributed throughout the internal cells of the monolith, analysis of the solids pick-up of the 6 monoliths indicated a variation between successively coated monoliths of plus or minus 8.5%. Discounting sample no. 8 where some obvious error must have occurred, the variation between successively coated monoliths of plus or minus 4.3%. These results are more fully disclosed in Table IV below.

TABLE IV

| SAMPLE NO. | GRAMS SLURRY VACUUM DRAWN | SUPPORT WEIGHT (grams) | | SOLIDS PICK-UP | % OF SLURRY |
|---|---|---|---|---|---|
| | | RAW | DRY* | | |
| 7. | 613 | 768 | 1052 | 284 | 46 |
| 8. | 613 | 765 | 1031 | 266 | 43 |
| 9. | 613 | 765 | 1043 | 278 | 45 |
| 10. | 613 | 763 | 1050 | 287 | 47 |
| 11. | 612 | 762 | 1049 | 287 | 47 |
| 12. | 612 | 765 | 1063 | 288 | 47 |
| | | | Average | 281 | 46% |
| | | | | $\Sigma = \pm 8.5\%$ | |

While the foregoing description of the process of the present invention, as well as the description set forth in the examples has been directed to the coating and impregnation of the interior skeletal structure of a ceramic monolithic element, it is understood, in view of the simple vacuum deposition apparatus used in the practice of the present invention, that there may well be alternative provision for a downward vacuum drawing of coating slurry through the upper end of the monolith with the vacuum applied to the periphery of the lower end of the monolith. This arrangement, when practiced in accordance with the method of the present invention, yields satisfactory coating results although such coating results are achieved with less efficiency and with greater handling problems. For example, in the draw down arrangement, a 50% excess of coating slurry may be required as compared with the upward vacuum drawing of coating slurry from the lower end of the monolith immersed in a bath of coating slurry in spaced relation to the bottom surface of the bath container.

In such an alternative draw-down vacuum impregnation process, the upper end of the monolith is covered with a distributor such as a paper or cloth filter, a breather cloth or metal screen, to uniformly disperse coating slurry over the upper end surface of the ceramic monolith support before the application of the vacuum pressure. A fluid tight reservoir is placed in contact with the periphery of the upper end of the monolith and a predetermined amount of coating slurry is metered into the reservoir through a suitable inlet. A hollow cover is placed over the periphery of the lower end of the monolith support member in sealing relation thereto to define a vacuum chamber below the lower end of the monolith support member. A vacuum is then drawn to draw the predetermined amount of coating slurry into the interior skeletal structure originally metered over the upper end of the monolith. It has been determined that with successive applications, coating slurries in the 20 to 50 centipoises range require greater than zero vacuum to that sufficient to draw 200 scfm of air over a 5-15 second period for each successive, generally a total of 304, draw-down of a portion of the coating slurry.

We claim:
1. A method of impregnating the interior skeletal structure of a ceramic monolithic catalyst support member with a slurry of coating material solids suspended in a volatile liquid component which comprises:
  metering a predetermined amount of the coating slurry into contact with a first end of the monolithic support member, said predetermined amount of slurry being determined in accordance with the formula:
  Volume of substrate (cu. in.) times Dry Gain (gms/cu. in.) divided by % solids in slurry/100 where,

Volume of substrate is the internal cross-sectional area multiplied by the height of the monolithic member, and Dry Gain is the amount of solid coating material remaining on the interior skeletal structure of the support member after removal of the volatile liquid component from the slurry metered into contact with the support member, placing a cover over the periphery of the opposite end of the monolithic support member in sealing relation thereto to define a vacuum chamber adjacent the opposite end of the support member, and then drawing a vacuum on the cover to draw coating slurry into the skeletal structure from the opposite end of the monolithic support whereby the interior skeletal structure is uniformly impregnated with the coated slurry.

2. The method of claim 1 wherein the first end of the monolith is the lower end of the monolithic structure, which lower end of the structure is partially submerged in the coating slurry contained in a vessel.

3. The method of claim 2 wherein the lower end of the monolith is submerged in the coating slurry in spaced relation to the bottom surface of the vessel.

4. The method of claim 3 wherein there is a gap between the lower end of the monolith and the bottom surface of the vessel of about 0.020 to 0.125 inches.

5. The method of claim 4 wherein the gap is about 0.040 inches.

6. The method of claim 1 wherein the coating slurry has a viscosity of about from 15 to 300 cps.

7. The method of claim 2 wherein the vacuum is drawn in at least two sequential stages wherein the vacuum pressure applied to the monolith is higher in a second stage than the vacuum pressure applied in the first stage.

8. The method of claim 7 wherein the vacuum in a first of the two stages is about from 0.5 to 0.7 inches of water and in a second of the two stages is about from 3.0 to 20.0 inches of water.

9. The method of claim 8 wherein the vacuum in the first stage is applied about from 1 to 8 seconds duration and in the second stage is applied about from 10 to 30 seconds in duration.

10. The method of claim 7 wherein the coating slurry has a viscosity in the range of about 17 to about 70 centipoises and the vacuum pressure drawn in the monolith in the second stage is about 5 to about 10 times the vacuum pressure drawn in the first stage.

11. The method of claim 2 wherein after a first portion of the predetermined amount of the coating slurry is drawn up into the lower end of the monolithic support member, the monolith is inverted 180 degrees to continue the vacuum draw-up of the remaining portion of the coating slurry into the upper end of the monolith.

12. The method of claim 11 wherein about 50 to about 85% by weight of the predetermined amount of the slurry is first drawn up into the lower end of the monolith and about 15 to about 50% by weight of the coating slurry is drawn up into the upper end of the inverted monolith.

13. The method of claim 1 wherein the predetermined amount of coating slurry is contacted with the upper end of the monolith, the lower end of the monolith being subjected to vacuum.

14. The method of claim 1 wherein the coating slurry is comprised of about 35 to about 52 percent by weight solids.

15. The method of claim 1 wherein the coating solids are comprised of high surface area alumina.

16. The method of claim 1 wherein the coating solids are comprised of a precious metal selected from the group consisting of platinum, palladium and rhodium.

17. The method of claim 1 wherein the coating slurry solids are a mixture of high surface area alumina and a precious metal selected from the group consisting of platinum, palladium and rhodium.

* * * * *

UNITED STATES PATENT AND TRADEMARK OFFICE
CERTIFICATE OF CORRECTION

PATENT NO. : 4,550,034

DATED : October 29, 1985

INVENTOR(S) : Thomas Shimrock et al.

It is certified that error appears in the above-identified patent and that said Letters Patent is hereby corrected as shown below:

Column 2, line 41, "by" should read -- but --.

Column 7, line 1, "drawn-through" should read -- draw-through --.

Column 9, line 30 "A9" should read -- I9 --.

Signed and Sealed this

Thirty-first Day of March, 1987

Attest:

DONALD J. QUIGG

Attesting Officer

Commissioner of Patents and Trademarks